(12) United States Patent
Blight et al.

(10) Patent No.: US 8,073,431 B2
(45) Date of Patent: Dec. 6, 2011

(54) TEMPORARY MESSAGING ADDRESS SYSTEM AND METHOD

(75) Inventors: David C. Blight, Oceanside, CA (US); David Kammer, Seattle, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 762 days.

(21) Appl. No.: 11/650,322

(22) Filed: Jan. 5, 2007

(65) Prior Publication Data

US 2007/0249325 A1    Oct. 25, 2007

Related U.S. Application Data

(63) Continuation of application No. 09/999,035, filed on Nov. 1, 2001, now Pat. No. 7,192,235.

(51) Int. Cl.
*H04M 1/725* (2006.01)

(52) U.S. Cl. ............... 455/412.2; 455/412.1; 455/414.2; 455/459; 370/312

(58) Field of Classification Search ............... 455/412.1, 455/459, 414.2, 412.2; 370/312
See application file for complete search history.

(56) References Cited

U.S. PATENT DOCUMENTS

| | | |
|---|---|---|
| 4,279,021 A | 7/1981 | See et al. |
| 4,415,065 A | 11/1983 | Sandstedt |
| 4,587,630 A | 5/1986 | Straton et al. |
| 4,725,694 A | 2/1988 | Auer et al. |
| 4,764,770 A | 8/1988 | Church |
| 4,887,212 A | 12/1989 | Zamora et al. |
| 4,892,981 A | 1/1990 | Soloway et al. |
| 4,916,441 A | 4/1990 | Gombrich |
| 5,010,547 A | 4/1991 | Johnson et al. |
| D320,598 S | 10/1991 | Auerbach et al. |
| 5,067,164 A | 11/1991 | Denker et al. |
| 5,101,439 A | 3/1992 | Kiang |
| 5,218,188 A | 6/1993 | Hanson |
| 5,227,614 A | 7/1993 | Danielson et al. |
| 5,334,824 A | 8/1994 | Martinez |
| 5,335,276 A | 8/1994 | Thompson et al. |
| 5,336,001 A | 8/1994 | Lichtenberg |
| 5,345,615 A | 9/1994 | Garofalo |
| 5,357,065 A | 10/1994 | Mitamura et al. |
| 5,359,317 A | 10/1994 | Gomez et al. |

(Continued)

FOREIGN PATENT DOCUMENTS

EP    0149762    7/1986

(Continued)

OTHER PUBLICATIONS

Ghauri, Irfan, et al, Blind Channel Identification and Projection Receiver Determination For Multicode and Multirate Situations in DS-COMA Systems, 2001 IEEE. XP-002233922; pp. 2197-2200.

(Continued)

*Primary Examiner* — Wayne Cai
*Assistant Examiner* — Chuck Huynh

(57) ABSTRACT

A messaging system is disclosed. The system includes a communications network including a wireless access point, a messaging server coupled to the communications network, and a mobile device in communication with the communications network via an access point. The mobile device has a mobile ID associated with the device, and a program running on the mobile device from which a temporary address may be created corresponding to the mobile ID. The temporary address is useable for messaging over the communications network. The temporary address is registered with the messaging server.

14 Claims, 3 Drawing Sheets

U.S. PATENT DOCUMENTS

| | | | |
|---|---|---|---|
| 5,379,057 A | 1/1995 | Clough et al. |
| 5,392,447 A | 2/1995 | Schlack et al. |
| D359,920 S | 7/1995 | Sakamoto |
| 5,430,436 A | 7/1995 | Fennell |
| 5,465,401 A | 11/1995 | Thompson |
| 5,494,363 A | 2/1996 | Hochgesang |
| 5,503,484 A | 4/1996 | Louis |
| 5,650,776 A | 7/1997 | Mitchell et al. |
| 5,705,995 A | 1/1998 | Laflin et al. |
| 5,708,655 A | 1/1998 | Toth et al. |
| 5,742,894 A | 4/1998 | Jambhekar et al. |
| 5,779,030 A | 7/1998 | Ikegami et al. |
| 5,812,651 A | 9/1998 | Kaplan |
| 5,813,778 A | 9/1998 | Shih |
| 5,901,211 A | 5/1999 | Dean et al. |
| 5,903,852 A | 5/1999 | Schaupp, Jr. et al. |
| 5,905,863 A | 5/1999 | Knowles et al. |
| 5,917,906 A | 6/1999 | Thornton |
| 5,936,614 A | 8/1999 | An et al. |
| 5,941,648 A | 8/1999 | Robinson et al. |
| 5,966,652 A | 10/1999 | Coad et al. |
| D416,256 S | 11/1999 | Griffin et al. |
| 6,038,547 A | 3/2000 | Casto |
| 6,044,275 A * | 3/2000 | Boltz et al. ................. 455/466 |
| 6,055,510 A | 4/2000 | Henrick et al. |
| 6,058,304 A | 5/2000 | Callaghan et al. |
| 6,061,346 A | 5/2000 | Noedman |
| 6,085,101 A * | 7/2000 | Jain et al. ................. 455/500 |
| 6,101,531 A | 8/2000 | Eggleston et al. |
| 6,151,507 A | 11/2000 | Laiho et al. |
| 6,157,630 A | 12/2000 | Adler et al. |
| 6,166,342 A | 12/2000 | Chou |
| 6,198,053 B1 | 3/2001 | Chou |
| 6,226,362 B1 | 5/2001 | Gerszberg et al. |
| 6,230,197 B1 | 5/2001 | Beck et al. |
| 6,256,631 B1 | 7/2001 | Malcolm |
| 6,259,931 B1 | 7/2001 | Singh |
| 6,278,442 B1 | 8/2001 | Griffin et al. |
| 6,295,372 B1 | 9/2001 | Hawkins et al. |
| 6,304,636 B1 | 10/2001 | Goldberg et al. |
| 6,304,753 B1 | 10/2001 | Hartmaier |
| 6,310,609 B1 | 10/2001 | Morgenthaler |
| 6,333,973 B1 | 12/2001 | Smith et al. |
| 6,346,952 B1 | 2/2002 | Shtivelman |
| D454,349 S | 3/2002 | Makidera et al. |
| 6,360,101 B1 * | 3/2002 | Irvin ................. 455/456.6 |
| 6,363,349 B1 | 3/2002 | Urs et al. |
| 6,370,018 B1 | 4/2002 | Miller et al. |
| D456,794 S | 5/2002 | Laverick et al. |
| 6,396,482 B1 | 5/2002 | Griffin et al. |
| 6,415,138 B2 | 7/2002 | Sirola et al. |
| D462,354 S | 9/2002 | Kimbre et al. |
| 6,452,588 B2 | 9/2002 | Griffin et al. |
| D464,962 S | 10/2002 | MacGregor et al. |
| 6,463,154 B1 | 10/2002 | Patel |
| 6,489,950 B1 | 12/2002 | Griffin et al. |
| D468,714 S | 1/2003 | Maruska et al. |
| D469,749 S | 2/2003 | Kim |
| D470,842 S | 2/2003 | Bhatia et al. |
| 6,516,202 B1 | 2/2003 | Hawkins et al. |
| D471,559 S | 3/2003 | DeSaulles |
| 6,532,368 B1 | 3/2003 | Hild et al. |
| D477,597 S | 7/2003 | Laverick et al. |
| 6,611,254 B1 | 8/2003 | Griffin et al. |
| 6,611,255 B2 | 8/2003 | Griffin et al. |
| 6,618,593 B1 * | 9/2003 | Drutman et al. ........... 455/456.3 |
| 6,628,938 B1 | 9/2003 | Rachabathuni et al. |
| 6,630,944 B1 | 10/2003 | Kakuta et al. |
| 6,633,761 B1 | 10/2003 | Singhai et al. |
| 6,658,254 B1 | 12/2003 | Purdy et al. |
| 6,671,735 B1 | 12/2003 | Bender |
| 6,684,068 B1 | 1/2004 | Tikka et al. |
| D488,478 S | 4/2004 | Laverick et al. |
| 6,751,453 B2 | 6/2004 | Schemers et al. |
| 6,763,235 B2 | 7/2004 | Imai |
| 6,799,033 B2 | 9/2004 | Kanefsky |
| 6,867,763 B2 | 3/2005 | Griffin et al. |
| 6,870,828 B1 | 3/2005 | Giordano, III |
| 6,873,317 B1 | 3/2005 | Griffin et al. |
| 6,891,529 B2 | 5/2005 | Ladouceur et al. |
| 6,919,879 B2 | 7/2005 | Griffin et al. |
| 6,938,067 B2 | 8/2005 | Hershenson |
| 6,981,223 B2 | 12/2005 | Becker et al. |
| 7,007,239 B1 | 2/2006 | Hawkins et al. |
| D518,820 S | 4/2006 | Hawkins et al. |
| D518,825 S | 4/2006 | Hawkins et al. |
| D519,502 S | 4/2006 | Hawkins et al. |
| 7,028,263 B2 | 4/2006 | Maguire |
| 7,035,382 B1 | 4/2006 | Shin et al. |
| 7,054,441 B2 | 5/2006 | Pietikosa |
| 7,061,403 B2 | 6/2006 | Fux |
| 7,103,010 B2 | 9/2006 | Melideo |
| 7,103,370 B1 | 9/2006 | Creemer |
| 7,103,388 B2 | 9/2006 | Scott |
| 7,266,584 B2 | 9/2007 | Mullen et al. |
| 7,353,034 B2 | 4/2008 | Haney |
| 2001/0006889 A1 | 7/2001 | Kraft |
| 2001/0021649 A1 | 9/2001 | Kinnunen et al. |
| 2001/0025309 A1 | 9/2001 | Macleod et al. |
| 2002/0016735 A1 | 2/2002 | Runge et al. |
| 2002/0019243 A1 | 2/2002 | Zhang et al. |
| 2002/0044136 A1 | 4/2002 | Griffin et al. |
| 2002/0069218 A1 | 6/2002 | Sull et al. |
| 2002/0115453 A1 * | 8/2002 | Poulin et al. ................. 455/456 |
| 2002/0115476 A1 | 8/2002 | Padawer et al. |
| 2002/0147614 A1 | 10/2002 | Doerr et al. |
| 2002/0190957 A1 | 12/2002 | Lee et al. |
| 2003/0005048 A1 | 1/2003 | Risalvato |
| 2003/0033582 A1 | 2/2003 | Klein et al. |
| 2003/0065788 A1 | 4/2003 | Salomaki |
| 2003/0114174 A1 | 6/2003 | Walsh et al. |
| 2003/0149527 A1 | 8/2003 | Sikila |
| 2004/0111477 A1 * | 6/2004 | Boss et al. ................. 709/206 |
| 2004/0137884 A1 | 7/2004 | Engstrom et al. |
| 2004/0166829 A1 | 8/2004 | Makae et al. |
| 2004/0185883 A1 | 9/2004 | Rukman |
| 2004/0218609 A1 | 11/2004 | Foster et al. |
| 2004/0233159 A1 | 11/2004 | Badarneh |
| 2004/0239639 A1 | 12/2004 | Stavely et al. |
| 2005/0043036 A1 | 2/2005 | Ioppe et al. |
| 2005/0043037 A1 | 2/2005 | Ioppe et al. |
| 2005/0097189 A1 | 5/2005 | Kashi |
| 2006/0030339 A1 | 2/2006 | Zhovnirovsky et al. |
| 2006/0034434 A1 | 2/2006 | Kashi |
| 2007/0036286 A1 | 2/2007 | Champlin et al. |
| 2007/0060174 A1 | 3/2007 | Newton et al. |

FOREIGN PATENT DOCUMENTS

| | | |
|---|---|---|
| EP | 0611239 | 8/1994 |
| EP | 1104151 | 5/2001 |
| EP | 1117185 | 7/2001 |
| WO | WO 2008/030967 | 3/2008 |

OTHER PUBLICATIONS

Tripathi, Vinayaik, et al. "Multiple Access Interference Resistant Channel Acquisition for Wideband COMA Signals", 2000 IEEE; pp. 956-960.

U.S. Appl. No. 11/786,550, filed Apr. 11, 2007, Stewart.

Screen Dumps of Microsoft Internet Explorer 6.0, 2001 pp. 1-13.

"3GPP2 Multimedia Messaging System- MMS Specification Overview—Revision: A" [online], May 2003, Mobile Messaging, [retrieved on Dec. 10, 2004]. Retrieved from the Internet: <URL:http://www.lebodic.net/left.htm>.

"An Introduction to Mobile Messaging" [online], May 2003, Mobile Messaging, [retrieved on Dec. 10, 2004]. Retrieved from the Internet: <URL:http://www.lebodic.net/intro.htm.

Toshiba Computer Systems Group (http://www.toshiba,com) May 28, 2002.

Toshiba Computer Systems Group: Pocket PC e570 (http://www.pda.toshiba.com) Jul. 7, 2001.

Hewlett Packard, Products and services, (http://www.hp.com/) Nov. 11, 2001.

T-Mobile Products; Handhelds (http://www.tmobile.com) Sep. 28, 2002.

T-Mobile Products; Sidekick (http://www.tmobile.com) Sep. 28, 2002.

Nokia Introduces Mobile Chat With Nokia 3310, [online], Sep. 1, 2000, [retrieved on Nov. 17, 2003], <http:..www.mobiletechnews.com/info/2000/09/01/142022.htm>.

Nokia, Frequently Asked Questions; [online], [retrieved on Nov. 17, 2003], <http://www.nokia.co.in/nokia_apac/india/faqs_list/0,18778,39_41,00.html>.

*American Programmer*, N. Y., American Programmer, Inc. (Dec. 1991), pp. 1-32.

*At Last, Technology Harnesse* [sic] *One of the Most Powerf* [sic] *Forces known to Man.*, Foster City, GO Corporation, 1991, 14 pages.

AT&T New Release, *NCR Cuts Price of 3170 Notebook Computer 11 to 19 Percent* [online]. (Mar. 8, 1993), Retrieved from the Internet: URL:http://www.att.com/press/0393/930308.nca.html 2 pages.

Carr, R.M., The Point of the Pen, Byte (Feb. 1991, Reprinted), 10 pages.

Cullen, A., *Connecting With Your EO Cellular Module*, Mountain View, EO, Inc., 1992, 1993, 42 pages.

Cullen, A., *Getting Started With Your EO Personal Communicator*, Mountain View, EO, Inc., 1992, 1993, pp. ii-74.

Cullen, A., *Lookup Guide to the EO Personal Communicator*, Mountain View, EO Inc., 1992, 1993, pp. ii-320.

Go Corporation Information Statement, (Nov. 8, 1993), 228 pages.

*IBM Selects Racotek Data/Voice Communications Services to Interface With Touchmobile Product*, PR Newswire (Jan. 25, 1993), 2 pages.

*IBM TouchMobile Information and Planning Guide*, International Business Machines Incorporated (Mar. 1993), 20 pages.

*IBM TouchMobile Solution for Data Capture and Communication, Keeping Your Business Moving in the 90s*, International Business Machines Incorporated (Jan. 1993), 13 pages.

*IBM's Touchmobile Helps Field Workers Collect Data at the Touch of a Finger*, PR Newswire (Jan. 26, 1993), 2 pages.

MacNeill, D., *Messaging Card and NewtonMail: We Pick Up and Deliver*, On The go Magazine [online]. (Oct. 13, 1993), Retrieved from the Internet: URL:http://www.pencomputing.com/Newton/NewtonNotes2.html 2 pages.

MacNeill, D., *Wireless Newton Technology Goes to Work, On the Go Magazine* [online]. (Sep. 8, 1993), Retrieved from the Internet: URL:http://www.pencomputing.com/Newton/NewtonNotes1.html 2 pages.

Maki, K., *The AT&T EO Travel Guide*, N.Y., John Wiley & Sons, Inc. 1993, pp. 559 pages.

Schlender, B.R., *Hot New PCs That Read Your Writing*, Fortune (Feb. 11, 1991, Reprinted), 6 pages.

Stock, R. The World of Messaging An Introduction to Personal Communications, Mountain View, EO , Inc., 1992, 1993, pp. ii-69.

International Search Report and Written Opinion of the International Searching Authority in International Application PCT/US2006/030827, European Patent Office, Jan. 15, 2007, 15 pages.

Internet Telephony Manager (ITM) User Guide, XP002413107, Dec. 1, 1996, pp. 1-5.

Nokia 6630 User's Guide, XP002413106, Mar. 28, 2005, pp. 1-109.

Sharma, A.K., Juneja, D., and Bishnoi, C., Intelligent Agents in Call Management System, Integration of Knowledge Intensive Multi-Agent Systems International Conference, XP010793134, Apr. 18, 2005, pp. 9-14.

Alken et al., "Microsoft Computer Dictionary," Microsoft Press, Fifth Edition, p. 523.

Non-Final US Office Action for U.S. Appl. No. 11/786,550, mail date Oct. 9, 2009, 14 pages.

US Office Action for U.S. Appl. No. 12/690,721, mail date Apr. 6, 2010, 8 pages.

US Office Action for U.S. Appl. No. 11/786,550, mail date May 5, 2010, 14 pages.

* cited by examiner

TEMPORARY MESSAGING ADDRESS SYSTEM AND METHOD

CROSS-REFERENCE TO RELATED APPLICATION

This application is a Continuation of U.S. application Ser. No. 09/999,035 filed Nov. 1, 2001 now U.S. Pat. No. 7,192,235, which is incorporated by reference in its entirety.

BACKGROUND

The traditional messaging systems (email and instant messaging) are designed around the philosophy of a fixed messaging server and static messaging addresses through which messages may be sent to reach the intended user. Once a messaging address is known, it may be used repeatedly to send messages. The address may also be used independent of time and location of either the sender or recipient.

In a more mobile environment, where users are using mobile wireless devices (such as a handheld or portable computer), traditional messaging systems may not be optimal. While the idea of a static messaging address is appealing, it is often not the most practical. Once a messaging address has been given out, there is no explicit mechanism to change or revoke an address. To revoke an address, the user must either cancel the messaging account (or no longer access it), or filter out messages from unwanted users. The former mechanism requires the user to notify people of a change in address (for those that should still be able to send messages), and the latter requires complex software and constant configuration on the client side. In addition, the second method places an increased load on the mobile device and its communication links.

An additional problem for messaging in a mobile network environment is the use of localized resources and ad hoc networks.

Accordingly, there is a need for a messaging system in a mobile network which utilizes temporary messaging addresses associated with unique mobile identifications.

There is also a need for a messaging server that is enabled to associate temporary messaging addresses with mobile devices. Further, there is a need for a method of communicating between a first mobile communications device and a second mobile communications device using temporary messaging addresses and, further, depending on specified conditions. Further still, there is a need for a method of alerting patrons of available services by utilizing temporary messaging addresses associated with individual mobile devices.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An exemplary embodiment of the invention relates to a messaging system. The messaging system includes a communications network including a wireless access point, a messaging server coupled to the communications network, and a mobile device in communication with the communications network via an access point. The mobile device has a mobile ID associated with the device and a program running on the mobile device from which a temporary address may be created corresponding to the mobile ID. The temporary address is useable for messaging over the communications network the temporary address being registered with the messaging server.

Another exemplary embodiment of the invention relates to a method of providing messaging services to a user of a mobile communications device. The method includes providing a mobile device having a mobile ID associated therewith and running a messaging program on the device. The method also includes creating, via the program, a temporary messaging address, communicating the temporary messaging address to a messaging server, and sending a message using the temporary messaging address.

Further, an exemplary embodiment of the invention relates to a messaging server. The messaging server includes a protocol adapter for receiving messages from mobile communications devices, each mobile communications device having a unique mobile ID associated therewith, a messaging queue for ordering the delivery of incoming and outgoing messages, sent from the mobile communications devices, and an address translator enabled to determine the mobile ID associated with the temporary delivery address identified in the incoming message.

Further still, an exemplary embodiment of the invention relates to a method of alerting a patron of an available service. The method includes creating a temporary messaging address associated with a mobile device having a unique mobile ID and sending a message to the temporary address through a server. The message includes a notification of the service availability. The method also includes translating the temporary messaging address to the mobile ID, by the server, and sending the message to the mobile device associated with the mobile ID.

Yet still another exemplary embodiment of the invention relates to a method of communicating between a first mobile communications device and a second mobile communications device. The method includes creating a first temporary messaging address associated with the first mobile communications device, creating a second temporary messaging address associated with the second mobile communications device, and providing conditions under which messages may be delivered between the two devices. The method also includes sending a message from the first mobile communications device to the second mobile communications device using the second temporary messaging address, determining if the conditions for sending the message are satisfied, and delivering the message to the second temporary address if the conditions are satisfied.

Alternative exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF EXEMPLARY EMBODIMENTS

Figure 1:
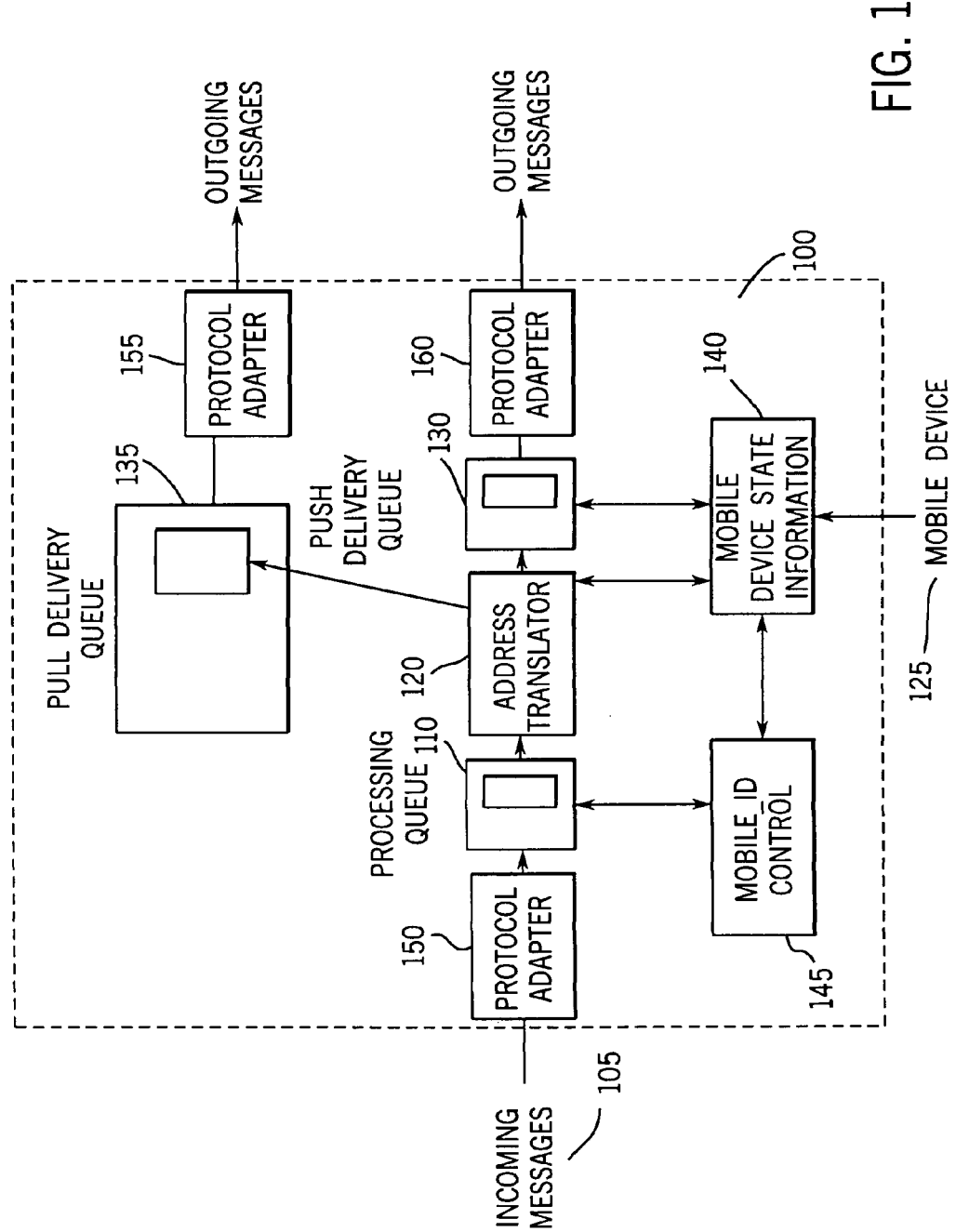
FIG. 1 is a block diagram of a messaging server.

If a mobile user wants to have messaging capabilities with users in a localized geographical area it may be advantageous to use localized servers and addresses. This would offer the following advantages:

Better performance, less performance problems from larger area networks (e.g., delay, bandwidth).

Lack of global networking connections. Often a local area may offer a localized network with no general internet connectivity. Messaging could be accomplished via local servers with temporary addresses. This may especially be applicable in ad hoc networks.

The ability to explicitly exploit location and time information in messaging.

The ability to use, modify, or revoke messaging addresses.

The ability to switch from local to global messaging servers (use local service when available, but switch to global when leaving local area).

A mobile user may also have more than one mobile device (e.g., cell phone, PDA, pager, etc). Each one of these devices may be used for communication to the mobile user. In addition, the mobile user may have a preference as to which is used. It should be possible for a mobile user to register multiple devices, but specify a preference to which is used. In addition, some mobile devices do not permit direct communications between servers and devices (e.g., cell phones and pagers). Messages to these device may need to be passed through an external service (e.g., telephone system). This document discusses primarily data devices and local wireless devices, but the system and ideas disclosed may be applied to other, larger coverage area wireless technologies.

The disclosure relates to a system by which messaging addresses can be dynamically assigned to allow more user control over messaging. A system is available which can dynamically create new messaging addresses for a mobile user on demand. The mobile user can give out different messaging addresses to different people, and can revoke (cancel) an address anytime thereby preventing messages from reaching the user.

This messaging system also is ideally suited for localized messaging, as might be found in a shopping mall or other sites in which localized messaging may be useful.

A further component of a messaging system of the type disclosed is the use of location and time specification in message submission. When a message is sent, it may include both time and location conditions. Messages will only be delivered if the mobile user is in the specified location at the specified time.

The messaging system disclosed may include any one of or any combination of the following characteristics:

1. The mail recipient has control over the duration of existence of the messaging address.
2. Should support both e-mail (time insensitive) and instant messaging (time sensitive) standards.
3. The system should prevent spam (e-mail from unknown people) or unauthorized messages.
4. The system should support existing email and messaging standards.
5. Messages should be cancelable by the sender.
6. People can request to be notified of cancelled addresses.
7. Users can cancel mail addresses at any time.
8. Messaging system can not be used for tracking.
9. A mobile user can use multiple messaging addresses.

Associated with each mobile device may be one or more mobile IDS. A mobile ID may be a universal resource locator (URL) which specifies the location of services for a mobile device or any other unique identifier associated with an individual mobile device. URLs provide a standard format for specifying a resource (message service) independent of specific service or protocol. Examples include but are not limited to:

mailto:customer1@mall.com instantMessage://mobile.mall.com/customer1 email://customer1.mall.com message:customer1@xxx.yyy.com

The mobile ID may be used for services other than messaging and provides a common format for such services. As an example, a mobile device may be assigned mobile ID:

MobileID://mobile.mall.com/customer1

The email or instant messaging address could be obtained from the Mobile ID by replacing the protocol specification with the appropriate services requested. For example:

Email://mobile.mall.com/customer1

The system may be configured to support two (or more) types of addressable entities, such as mobile devices and mobile users.

A mobile user may have multiple mobile devices (e.g., a laptop computer, a handheld computer, a pager, a mobile telephone, etc.). Messages may be redirected between the different mobile devices (e.g., e-mail messages redirected to a pager).

Referring now to FIG. 1, in an exemplary embodiment a messaging server 100 may be a localized server which provides messaging services. It may be responsible for receiving messages, buffering messaging, and sending messages to the mobile devices among other tasks.

The architecture of message server 100 includes two processing queues. The first queue (processing queue 110) holds incoming messages 105 and messages waiting for condition (location and time) satisfaction. A message is removed from the queue when all conditions are satisfied, for example, time and/or location conditions.

An address translator 120 is responsible for translating an address of message 105. The mobile ID of message 105 is converted into an address used for delivery to a mobile device 125. Address translator 120 may also be used to redirect messages to different mobile devices (if specified by the mobile user).

A delivery queue holds messages until the mobile ID can be translated into a physical address. The delivery queue may include a push delivery queue 130 and a pull delivery queue 135. The push delivery queue attempts to deliver a message when mobile device 125 is accessible. If mobile device 125 is unavailable, the message is held in this queue until a physical address is available. Pull delivery queue 135 is used for queuing messages which must be pulled by the client. Messages are stored until requested by the client. The queue may support legacy protocols, such as but not limited to IMAP, POP or others.

Mobile device events are notifications in the change of location (or other properties) of mobile device 125. These events are used to trigger the condition of messages waiting in the processing queue. A mobile device state information unit 140 keeps track of the current location of mobile device 125 and its current physical address. The current location may be supplied through a location determination service on or linked to the network.

A mobile ID control unit 145 is responsible for keeping track of mobile IDs. Messages may also be sent to mobile device control unit 145. These message represent control messages used to allocate, modify, and change mobile IDs.

Acknowledgement messages (containing a message ID) are sent once the message has left the delivery queue.

The basic functionality of the server may include but is not limited to:

Support existing messaging standards. The server can act as a server for existing messaging protocols. For example, IMAP, POP, Instant Messaging (Jabber, AOL, MS, etc).

Receive location events. When the network detects that a mobile device has moved location, a location event is sent to message server 100. The condition on pending messages are evaluated to see if they should be released. For example, notification of when the mobile device moves and/or sending messages on condition evaluation.

Buffering messages. For example, messaging waiting for events and/or messaging waiting for delivery.

Receive message. For example, return message ID, and/or make or contain time and location conditions.

Cancel message. For example, message specified by message ID.

Send message. For example, return messages associated with mobile ID.

Direct messages. For example, the message server can forward messages to another server.

Revoke message address. For example, turn off a message address.

Message delivery confirmation. For example, recipient controlled.

The protocol adapters are used to support the different protocols and encoding with different existing messaging systems.

In an exemplary embodiment, the following communications may be supported by message server 100:

Register mobile_user, used to register a mobile user.
Register mobile_device, used to register a mobile_device.
Set mobile_user preferences, such as a message describing any processing to be applied to messages, for example, message redirection and/or message filtering.
Send message, used to send a message.
Receive message, used to get a message.
Unregister mobile_user, used to cancel mobile_user and all associated mobile_devices.
Unregister mobile_ID, used to cancel mobile_ID.
Query messageServer, used to get a description of message server capabilities and configurable capabilities.

In an exemplary embodiment, the messaging client such as mobile device 125 should support the following operations:

Send message wherein the Message_ID may be returned.
Receive/display message.
Create new mobile ID.
Delete mobile_ID.
Location specification.
Time specification.
Cancel message.
View all messages including those deleted and/or including those waiting for events.

Figure 2:
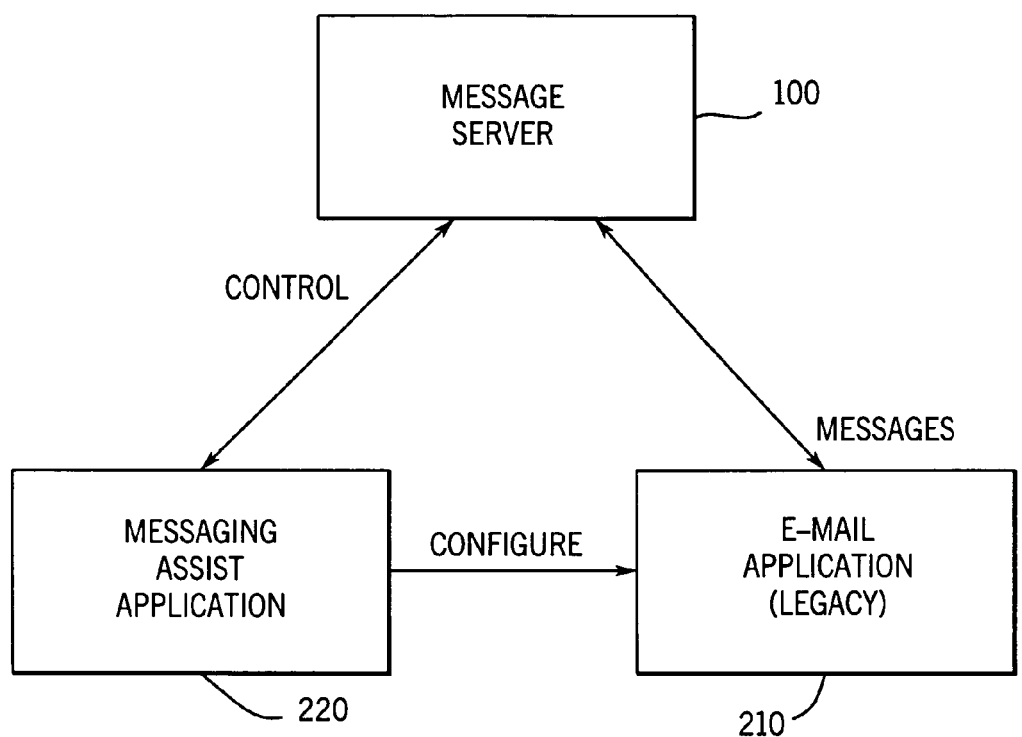
FIG. 2 is a block diagram of a messaging system.

Further, in an exemplary embodiment a legacy messaging application 210 (see FIG. 2) may be augmented with a client assist application 220.

The system should be compatible with existing messaging systems. Likewise, existing messaging clients should be compatible with this system, although full functionality may or may not be possible.

Figure 3:
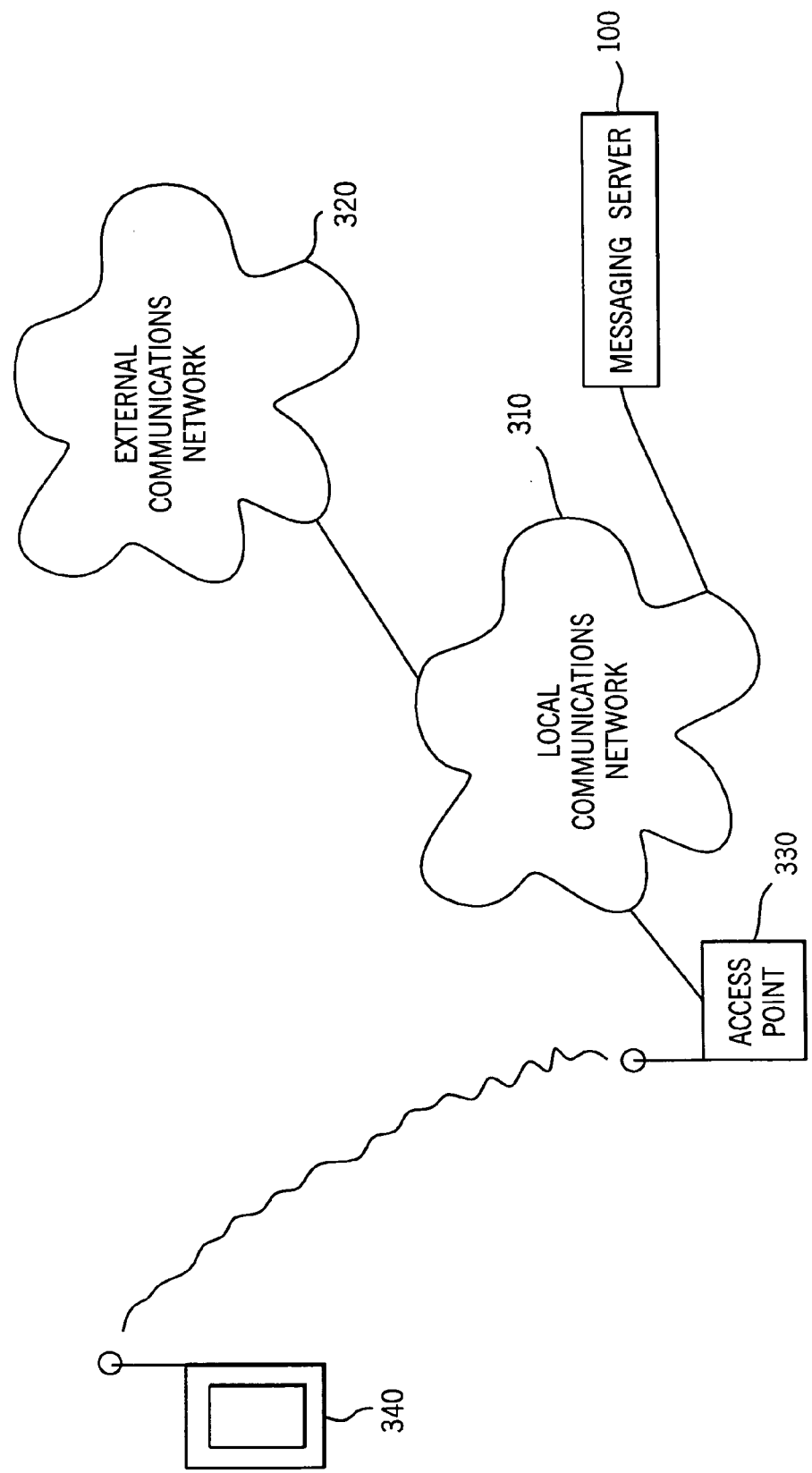
FIG. 3 is a block diagram of a communications system.

Referring now to FIG. 3, messaging server 100 is coupled to a local communications network 310 for sending messages to users connected to local communications network 310 or, alternatively, to an external communications network 320. As described above, local communications network 310 includes access points 330 that provide wireless access from mobile devices 340 to local communications network 310. In the exemplary embodiments disclosed, mobile device 340 is enabled to create temporary addresses utilized by devices accessing local communications network 310 via messaging server 100.

The mobile ID can be used to determine the email or instant messaging address of the mobile user. These addresses can be passed to existing email and instant messaging systems so that they can send messages.

Any e-mail or instant messaging client can be used to send messaging in this system.

The mobile user can also use standard instant messaging/email clients. The client application would need to be configured to bind themselves to the proper servers, and supply correct user ID/passwords for message retrieval. Not all existing messaging client support multiple addresses.

A legacy e-mail 210 or instant messaging system may be unable to specify location specific properties of a message, cancel messages, or be notified of address cancellation as the existing application and protocol do not typically support these types of operations. Accordingly, messaging assist application 220 may provide an interface for e-mail application 210 and message server 100, wherein message server 100 is enabled to handle mobile users using temporary messaging addresses.

In yet a further exemplary embodiment, a cell phone voice system may be accessible through a plain old telephone system (POTS). Voice calls may be sent through the telephone system and a mobile user would need to register the telephone number. Voice messages may also be sent through the POTS and a mobile user needs to register the telephone number. Text messages (e.g., SMS) may also be sent through a carrier message service and a mobile user needs to register a message address. Further, pager messages may be sent through the POTS of message service and a mobile user needs to register a telephone number or message service address.

When a message is sent, location conditions may be placed on the message. Location may be specified in many ways, including but not limited to, absolute coordinates (GPS, latitude, longitude), relative coordinates (to message server, mobile device, or other objects), zones (location specific zones), transitions into or out of zones, and other formats.

Location specifications may not be allowed which enable tracking. It may be valid for a mobile user 1 to specify that a message should be sent to mobile user 2 when they are within 100 meters, but not valid for mobile user 1 to request a message to be sent to himself when they are more than 100 meters apart. This could only be done with cooperation of mobile user 2. The location information may be encoded into messages depending upon message encoding scheme including, but not limited to, MIME extension for e-mail or XML tag.

To determine which location formats are accepted by message server 100, limits of location values, and defined zones, a message may be sent to message server 100 requesting the information. The information may be supplied in XML encoded format, for example.

A message address may be deleted be either the mobile user or the message service provider. Also, it is desirable to eliminate unused mobile IDs. A customer, for example, may have the option to specify how long the address is valid.

The messaging service provider (e.g., mall management) may also explicitly or implicitly limit the validity of the mobile addresses. Options may include, but are not limited to, adding temporary addresses deleted at regular times, such as when the mall closes. Having mobile IDs deleted after a period of non-use, for example, one day with no messages, or two days with stored messages. Also, mobile IDs may be deleted at a user specified time. Further, a mobile ID may be deleted when the customer leaves the mall. In an exemplary embodiment, leaving the mall may be differentiated from turning the device off.

Messages or mobile IDs may also be deleted if the number of messages being stored or delivered becomes excessive (e.g., in the case of SPAM or mail bomb reaction).

Example 1

Consider a retail shopping mall. Customers may use mobile devices (such as PDAs) with wireless connections for various location based services. A customer requests a service (such as 1 hour photo service) in a store within the mall. The service will be complete at some time in the future and the customer wishes to be notified when the service (photo developing) is complete.

The customer can communicate through a wireless technology (such as 802.11 or Bluetooth) to a mall network support services for mobile devices. The customer can request a mobile ID from the network. This ID is then passed to the photo store as the address to use for sending notices. When the customer' film is developed, the store can send a message to him using his mobile ID.

The store may also choose to send a location specific message. If the customer is detected outside of the mall, they may send him another message reminding him of the developed film.

Once the film is collected, location based messages should be cancelled (you don't want to bother the customer).

Example 2

The same customer (as in example 1) is hungry, and wants to eat. He selects a restaurant in the mall he wants to eat at, but it has a waiting list. Through his mobile device he requests a reservation (or to be put on waiting list). He gives his mobile ID (same as example 1) to the restaurant and asks to be notified when his table is ready.

When the customer's name is getting near the top of the list, the restaurant wants to warn the customer that his table will be ready soon. The restaurant sends the following messages:

When the customer is fifth on the list, send message to the far locations of the mall.

When the customer is third on the list, they send message to the medium distances away part of the mall and the previous message is cancelled.

When the customer is first on the list, they send message to all locations in mall and the previous message is cancelled.

When the customer receives the message, he can reply to acknowledge he still wants the table.

Example 3

The same customer goes into a store and asks a clerk for help in finding an item. The clerk says she will need to go and check the backroom. She will message him when she knows if the item is available.

The customer requests a new mobile ID, and gives it to the clerk. After looking around the store, he decides he is not interested in the item, and cancels the mobile ID. There is no reason for the store to bother the customer. He can still receive other messages (examples 1 and 2). The clerk may be notified of the cancelled ID, if she requested notification in advance.

Example 4

A husband and wife are shopping separately in the mall. If they are near each other they would like to be informed. Both husband and wife send each other a message with a separation condition of 100 meters. When they are within 100 meters, their messages are delivered. They may then communicate to see where the other is.

Example 5

A meeting is schedule for 5:00 p.m. in conference room A. When the meeting is scheduled, a message is sent to everyone in the meeting with the following conditions
Time 5:00 p.m.
Location (conference room A).
A reminder message is sent. If the meeting is altered, the messages may be cancelled.

Example 6

A mobile user enters a mall. He registers himself as a mobile user. He registers his handheld computer and pager. He queries the message server and determines the server can support message redirection. He sends a configuration message to the message server stating than any messages destined for his handheld computer should be redirected to his pager. Whenever a message is sent to his handheld computer, the message server redirects it to his pager. When he leaves the mall, he unregisters his mobile_user, and all addresses are deleted.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A system, comprising:
a computer configured to:
receive location information from a first mobile device and a second mobile device;
determine whether a location of the first mobile device and a location of the second mobile device are within a distance requirement;
notify the first mobile device that the second mobile device is within the distance requirement; and
in response to notifying the first mobile device that the second mobile device is within the distance requirement:
receive a first SMS message from the first mobile device; and send a second SMS message to the second mobile device to notify a user of the second mobile device that a user of the first mobile device is within the distance requirement, wherein the second SMS message comprises text from the first SMS message and is communicated to the second mobile device based on the first mobile device and the second mobile device meeting the distance requirement during a specific time period.

2. The system of claim 1, wherein the computer comprises a push delivery queue configured to store the second SMS message until the first mobile device and the second mobile device meet the distance requirement.

3. The system of claim 1, further comprising a state information unit configured to store the locations of the first mobile device and the second mobile device and a physical address associated with each of the first mobile device and the second mobile device.

4. The system of claim 1, wherein the location information of the first mobile device and the second mobile device is provided by a location determination service associated with a network.

5. The system of claim 1, wherein the computer is configured to receive and store a message addresses associated with the first mobile device and the second mobile device.

6. The system of claim 1, wherein at least one of the first mobile device or the second mobile device is a wireless phone.

7. The system of claim 1, wherein the computer is further configured to receive a plurality of recipient IDs, wherein at least one of the recipient IDs is associated with the second mobile device.

8. A system, comprising:
a computer coupled to a wireless communication network, the computer configured to:
register a mobile device;
associate one or more recipient IDs to the mobile device, wherein each of the one or more recipient IDs are associated with a respective one or more messaging transports;
receive a message for communication to the mobile device;
determine a location of the mobile device; and send the message to the mobile device and one or more additional devices associated with the one or more recipient IDs, while the mobile device is within a location requirement;
determine a location of at least a second mobile device associated with a second one or more recipient IDs;
send a message received from the first mobile device to the second mobile device when the locations of each of the first mobile device and the second mobile device meet a location requirement; and
wherein the computer is further configured to send the message to the second mobile device when the second mobile device is at a predetermined location at a predetermined time.

9. The system of claim 8, wherein each of the one or more recipient IDs include mobile user IDs.

10. The system of claim 8, wherein the location requirement is a predetermined location.

11. The system of claim 8, wherein the message is a text message.

12. The system of claim 11, wherein the text message is in a short message service (SMS) format.

13. The system of claim 8, wherein the message sent from the first mobile device includes time and location data.

14. The system of claim 8, wherein the mobile device is a wireless phone.

\* \* \* \* \*